US009676068B2

(12) United States Patent
Claver et al.

(10) Patent No.: US 9,676,068 B2
(45) Date of Patent: Jun. 13, 2017

(54) METHOD OF REMANUFACTURING USED CYLINDER LINERS AND MASK AND USED CYLINDER LINER ASSEMBLY

(71) Applicant: Caterpillar, Inc., Peoria, IL (US)

(72) Inventors: Aaron Claver, Congerville, IL (US); Trent Simpson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 327 days.

(21) Appl. No.: 13/940,611

(22) Filed: Jul. 12, 2013

(65) Prior Publication Data

US 2015/0013159 A1    Jan. 15, 2015

(51) Int. Cl.
*B23P 6/02* (2006.01)
*F16J 10/04* (2006.01)
*F02F 1/00* (2006.01)
*C21D 7/06* (2006.01)

(52) U.S. Cl.
CPC ............... *B23P 6/02* (2013.01); *C21D 7/06* (2013.01); *F02F 1/004* (2013.01); *F16J 10/04* (2013.01); *F02F 2001/008* (2013.01); *Y10T 29/49233* (2015.01)

(58) Field of Classification Search
CPC ....... F02F 1/004; F02F 2001/008; B23P 6/02; C21D 7/06; F16J 10/04; Y10T 29/49233; Y10T 29/49719; Y10T 29/49748; Y10T 29/4975; B21D 31/06; B24C 1/10; C22F 1/00; C22C 21/02; F04B 39/126
USPC .................... 29/888.011, 888.061; 92/171.1
See application file for complete search history.

(56) References Cited

U.S. PATENT DOCUMENTS

| 2,361,434 A | 10/1944 | Surtees | |
| 2,818,359 A * | 12/1957 | La Belle | C21D 7/04 148/544 |
| 4,486,938 A * | 12/1984 | Hext | B23P 6/00 29/401.1 |
| 4,706,616 A | 11/1987 | Yoshimitsu | |
| 4,967,458 A * | 11/1990 | Rosenberg | B23P 6/00 228/119 |
| 5,545,268 A | 8/1996 | Yashiki et al. | |
| 6,189,356 B1 | 2/2001 | Simeone et al. | |
| 7,665,440 B2 * | 2/2010 | Holtan | B22D 19/0009 123/193.2 |
| 2010/0139607 A1 | 6/2010 | Herbst-Dederichs et al. | |
| 2011/0016711 A1 | 1/2011 | Simpson et al. | |

FOREIGN PATENT DOCUMENTS

| CN | 101631632 | 1/2010 |
| DE | 102009043566 | 4/2011 |
| JP | 6354497 | 10/1988 |

(Continued)

*Primary Examiner* — Jason L Vaughan
(74) *Attorney, Agent, or Firm* — Mattingly Burke Cohen & Biederman (57) ABSTRACT

Remanufacturing a used cylinder liner includes receiving a used cylinder liner having a fillet relieved of residual compressive stress via service in an engine, and compressing a material substrate of the cylinder liner forming a fatigue sensitive fillet, such that a non-uniform profile of the fillet is reshaped via plastic deformation of the material substrate. Residual compressive stress is restored to the fillet at least in part via the plastic deformation. A mask and used cylinder liner assembly for processing the used cylinder liner during remanufacturing is also disclosed.

16 Claims, 4 Drawing Sheets

(56) References Cited

FOREIGN PATENT DOCUMENTS

| | | |
|---|---|---|
| JP | 2616057 | 3/1997 |
| JP | 201138494 | 2/2011 |
| WO | 2007109766 | 9/2007 |

* cited by examiner

METHOD OF REMANUFACTURING USED CYLINDER LINERS AND MASK AND USED CYLINDER LINER ASSEMBLY

TECHNICAL FIELD

The present disclosure relates generally to the field of remanufacturing, and more particularly to restoring residual compressive stress to a fatigue sensitive fillet in a used cylinder liner.

BACKGROUND

Cylinder liners have been employed for many years in internal combustion engines. Rather than cylinder bores being defined directly by an engine block, an engine block may be equipped with a plurality of cylinder liners each defining a cylinder bore for receiving a piston. Cylinder liners are typically removable, such that upon engine servicing or rebuild the cylinder liners can be extracted from the engine block and replaced with new cylinder liners. Operating conditions in typical internal combustion engines can be quite harsh, subjecting cylinder liners to extremes of temperature, pressure, and relatively wide swings in those variables. For these reasons it is common for cylinder liners removed from an engine after service to be worn or deformed out of original specifications. In certain instances cylinder liners may be damaged such as by cracking, and standard practice has long been to scrap all cylinder liners rather than attempting repair and/or reuse.

For various reasons, in recent years a premium has been placed on reuse of parts and materials in many commercial areas, notably the field of engine repair and remanufacturing. The motivations behind reuse can be economic, technical, due to various administrative requirements, or combinations of these and other factors. In the case of certain components which by their nature are intended to be replaceable, cylinder liners being one example, the various cross-coupled factors affecting viability of reuse have not yet aligned and/or the technical know how to actually implement reuse practices has simply not existed. In the field of remanufacturing, parts to be reused typically must be prepared to a state as good as or better than new before they are considered ready for returning to service. Remanufacturing engineers and technicians often rely upon a print or other source of specifications for new parts as the standard to which remanufactured parts must be returned. Even where factors theoretically align to make remanufacturing and reuse of certain parts economically feasible, the challenges to satisfying original specifications can render remanufacturing and reuse impossible or impractical. Compounding these challenges is a general lack of understanding respecting failure modes and phenomena such as wear, stress and strain that are experienced by various components during service. One known engine repair strategy that relates to cylinder head joints is taught in commonly owned U.S. Pat. No. 5,575,251 to Bock, but does not appear to extend to repairing a cylinder liner itself.

SUMMARY

In one aspect, a method of remanufacturing a used cylinder liner for an internal combustion engine includes receiving a used cylinder liner having a fillet relieved of residual compressive stress via service in an internal combustion engine and having a non-uniform profile. The fillet extends circumferentially around a center axis of the cylinder liner at a fatigue sensitive location and adjoins a radially projecting cylinder liner flange. The method further includes compressing a material substrate of the cylinder liner forming the fillet, such that the non-uniform profile of the fillet is reshaped via plastic deformation of the material substrate. The method still further includes restoring residual compressive stress to the fillet at least in part via the plastic deformation.

In another aspect, a method of processing internal combustion engine cylinder liners includes receiving a group of used cylinder liners each having a fatigue sensitive fillet relieved of residual compressive stress via service in an internal combustion engine, and sorting the group of used cylinder liners into a first subset for remanufacturing, responsive to satisfaction of a fillet restorability criterion, and into a second subset. The method further includes compressing material substrates forming the fillets in each of the cylinder liners of the first subset such that the fillets are reshaped via plastic deformation of the corresponding material substrate to restore residual compressive stress therein. The method still further includes forwarding the used cylinder liners following restoration of the residual compressive stress to an inventory for returning to service in an internal combustion engine.

In still another aspect, a mask and used cylinder liner assembly for processing the used cylinder liner during remanufacturing includes a used cylinder liner having an elongate liner body formed of a material substrate, the elongate liner body defining a longitudinal center axis and having an inner liner surface, an outer liner surface, and a radially projecting flange. The elongate liner body further includes a fillet extending circumferentially around the center axis at a fatigue sensitive location adjoining the radially projecting flange. The fillet is relieved of residual compressive stress via service in an internal combustion engine and has a non-uniform profile, such that the fillet is unsuited for restoring the residual compressive stress via roll burnishing. The assembly further includes a removable mask attached to the elongate liner body and obscuring a first axial segment of the outer liner surface on a first axial side of the fillet and a second axial segment of the outer liner surface on a second axial side of the fillet, such that the material substrate forming the fillet is exposed for application of compressive force to restore the residual compressive stress.

DETAILED DESCRIPTION

Figure 1:
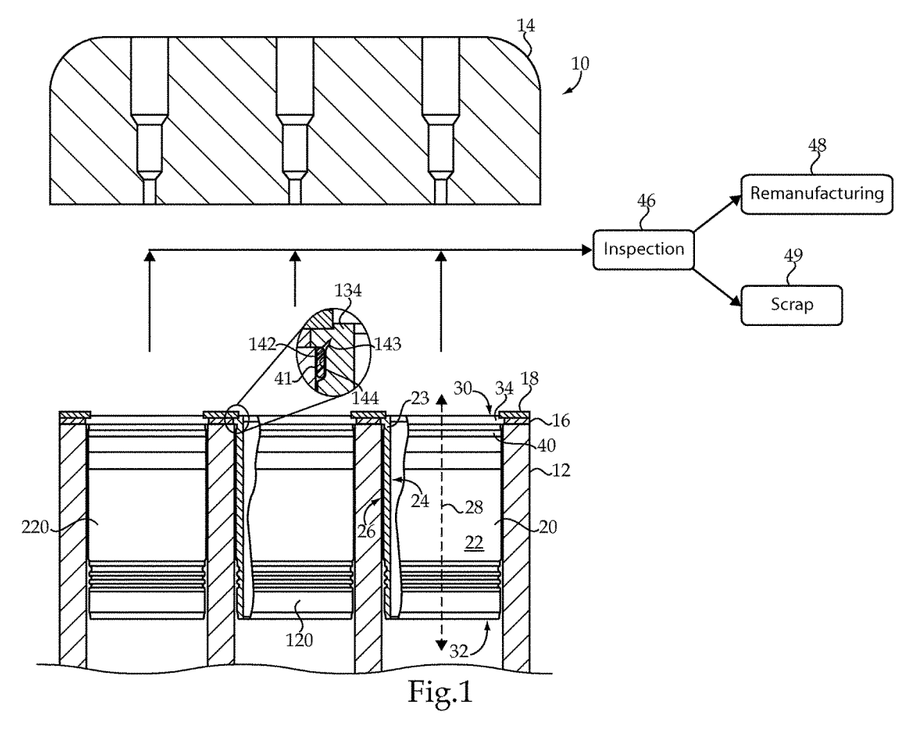
FIG. 1 is a partially sectioned side diagrammatic view of an internal combustion engine at a disassembly stage for remanufacturing, according to one embodiment, and including a detailed enlargement.

Referring to FIG. 1, there is shown an engine 10 in a state of partial disassembly as it might appear during teardown in preparation for remanufacturing. Engine 10 includes a cylinder block 12 and cylinder head 14 shown detached from cylinder block 12. Engine 10 may include a direct injection compression ignition engine in many instances, however, the present disclosure is not thereby limited as such. Shown positioned within cylinder block 12 is a group of cylinder liners 20, 120 and 220. The group of cylinder liners may be received at a remanufacturing facility still positioned within cylinder block 12, but might be disassembled from cylinder block 12 and received for processing as loose units. Each of the cylinder liners in the group are so-called top support cylinder liners, each having an elongate liner body defining a longitudinal center axis. In FIG. 1, certain features are called out with respect to cylinder liner 20, while others are called out and shown in greater detail with respect to cylinder liner 120. All of the cylinder liners in the group received for manufacturing after removing from service in an engine may be of an identical design, and thus description herein of features of one of the cylinder liners in the group should be understood to apply to the other cylinder liners in the group, except where otherwise indicated. The elongate liner body of liner 20 is shown via reference numeral 22 in FIG. 1, and defines center axis 28 extending between a first axial end 30 and a second axial end 32. Cylinder liner 20 further includes an inner liner surface 24 and an outer liner surface 26 each extending between first axial end 30 and second axial end 32, and being generally cylindrical apart from various features of outer liner surface 26 that will be recognized by those skilled in the art as relating to cooling, cylinder liner mounting and positioning within cylinder block 12. As will be further apparent from the following description, the present disclosure contemplates unique strategies of processing and remanufacturing cylinder liners for returning used cylinder liners to service in an internal combustion engine.

As noted above, each of cylinder liners 20, 120 and 220 may be top-supported cylinder liners. To this end, cylinder liner 20 includes a radially projecting flange 34 that seats upon a top of cylinder block 12. A circumferential skirt 40 is spaced axially from radially projecting flange 34, and may have a relatively close clearance with cylinder block 12 to position cylinder liner 20 therein in a desired manner. One or more spacers 16 may be positioned upon cylinder block 12, outboard of radially projecting flange 34, and one or more conventional head gaskets 18 may be positioned upon spacers 16, such that when cylinder head 14 is positioned upon and clamped to cylinder block 12 gaskets 18 form a conventional combustion seal. Relatively high clamping loads of cylinder head 14 to cylinder block 12 tend to squeeze radially projecting flange 34 therebetween. These high clamping loads, coupled with thermal cycling, temperature extremes and other relatively harsh operating conditions of engine 10 during service, can subject radially projecting flange 34 to fatigue inducing conditions. Accordingly, radially projecting flange 34, and more particularly a material substrate 23 of which cylinder liner is formed may be considered fatigue sensitive, particularly in the region where flange 34 adjoins the rest of liner body 22 as further discussed herein. Other parts of cylinder liner 20 might be considered fatigue insensitive, such as the various geometric and surface features on outer liner surface 26 closer to second axial end 32, and not subjected to such harsh conditions during service.

Certain features of liner 120 are shown in a detailed enlargement in FIG. 1, including a radially projecting flange 134, a filler band groove 144, and a fillet 142 extending circumferentially around a center axis of cylinder liner 120 at the fatigue sensitive location adjoining radially projecting flange 134. A filler band 41 is positioned within groove 144, and may be an elastomeric seal. When received for processing and remanufacturing, some members of the group of cylinder liners may be suitable for remanufacturing, while others might not. Cylinder liner 120 is one example of a cylinder liner exhibiting damage from service in an internal combustion engine that renders it unsuitable for remanufacturing. In particular, a crack 143 where the material substrate has yielded extends through fillet 142. Although not shown in detail, cylinder liner 20 and potentially cylinder liner 220 may be assumed to have fillets which are crack free. Accordingly, an early stage of processing cylinder liners according to the present disclosure may include sorting a group of used cylinder liners into a first subset for remanufacturing, responsive to satisfaction of a fillet restorability criterion, and into a second subset. Once extracted from cylinder block 12, cylinder liners 20, 120 and 220 might be forwarded to an inspection stage 46 at which they are visually or machine inspected to determine which of the cylinder liners in the group satisfy the fillet restorability criterion. In one practical implementation strategy, the fillet restorability criterion might be the absence of visually observable cracks in a fillet of the respective cylinder liner, maybe without magnification, but also potentially at some predetermined level of magnification, say 10×. Cylinder liners having cracked fillets can be forwarded from inspection stage 46 to another stage 49 for further inspection, evaluation or testing, or simply to scrap. Cylinder liners having fillets which are free from cracks may be forwarded from inspection stage 46 to a remanufacturing stage 48.

It is contemplated that the presence or absence of cracks is one advantageous criterion for sorting repairable cylinder liners from non-repairable or only impracticably repairable cylinder liners. In other instances, a cylinder liner might have a crack free fillet but for other reasons be unsuitable for restoring the fillet to specs as good as or better than new, and thus be remanufactured in an alternative manner, or scrapped. For example, during service cylinder liners can in some instances deform or wear so that they are out of round, or potentially be chipped, corroded or pitted. Depending on the extent of such characteristics, as well as their type, such cylinder liners might not be considered viable for remanufacturing, and where such characteristics relate to the ability to practicably restore the fillet in a manner further discussed herein, they could be said to fail to satisfy the fillet restorability criterion. Runout of the cylinder bore defined by the inner liner surface, or runout of the radially projecting flange, the skirt, or still another feature deviating in some manner from specified circularity could render further processing to restore the fillet difficult, impossible, or too expensive, and thus the criterion not satisfied. Still further criteria relating to remanufacturability of cylinder liners, and thus serving as a basis for sorting used cylinder liners, will be apparent to those skilled in the art.

As discussed above, the harsh operating conditions in an internal combustion engine coupled with the design of cylinder liners amenable to the present remanufacturing strategies, render certain features of the cylinder liners fatigue sensitive. In anticipation of the fatigue inducing conditions during service, fillets on cylinder liners contemplated herein are typically pre-stressed, imparting residual compressive stress to the material substrate of the cylinder liner forming the fillet, extending its service life over what might otherwise be expected. Over the course of the cylinder liner's service life in an internal combustion engine, however, the residual compressive stress can dissipate partially or perhaps even entirely, depending upon the service conditions and duration. For this reason, when used cylinder liners are received after service in an engine, their fillets are commonly relieved of at least some of the residual compressive stress imparted during original manufacturing. Descriptions herein of restoring a fillet will thus be understood to include restoring residual compressive stress to the fillet. Those skilled in the art will thus appreciate that a cracked fillet such as fillet 142 in cylinder liner 120 might be considered impossible or at least impractical for restoration of residual compressive stress.

Figure 2:
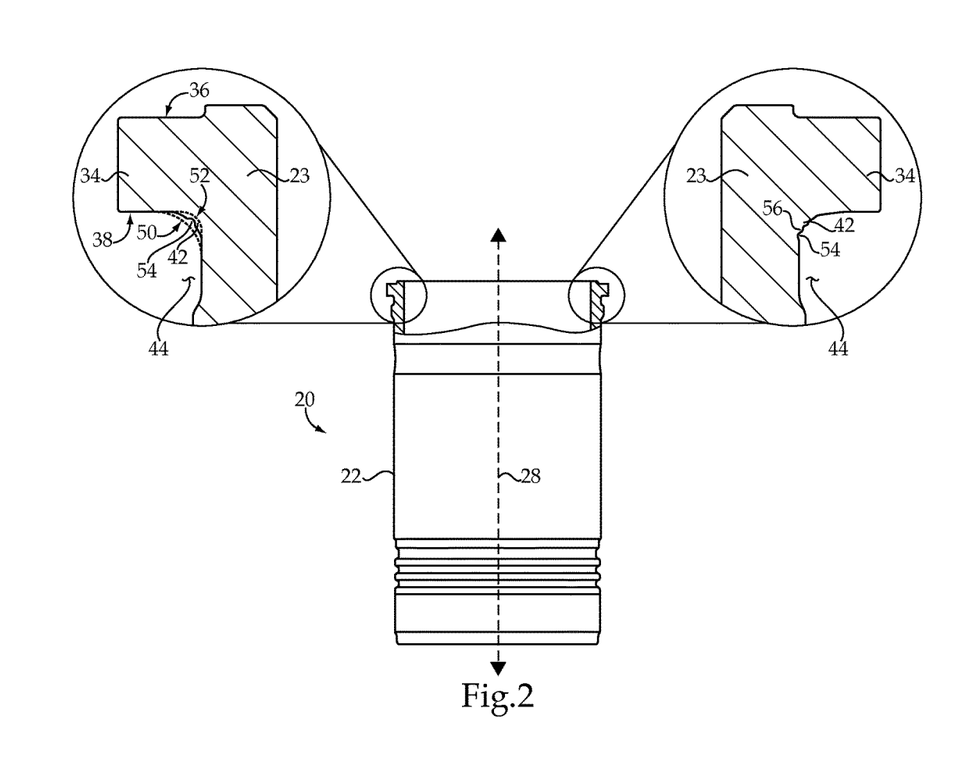
FIG. 2 is a partially sectioned side diagrammatic view of a portion of a cylinder liner removed from service in the engine of FIG. 1, and including detailed enlargements.

Referring now also to FIG. 2, there is shown cylinder liner 20, and including additional features by way of detailed enlargements. In the left detailed enlargement, there can be seen a sectioned view through flange 34 and illustrating sealing face 36 and engine block face 38 on opposite sides thereof. Adjoining flange 34 is a fillet 42 that transitions from flange 34 into filler band groove 44, such that a part of filler band 44 is defined by fillet 42, and a part defined by skirt 36. As discussed above, residual compressive stress will typically have been imparted to material substrate 23 forming fillet 42 during original manufacturing. Roll burnishing may be used for this purpose, and a roll burnishing groove 54 in fillet 42 may still be evident. A pre-rolling profile 50 is also shown in phantom line in the left detailed enlargement, and illustrates generally what a profile of fillet 42 might look like prior to imparting the residual compressive stress during original manufacturing. A post-rolling profile 52 is also shown, and illustrates generally what the profile of fillet 42 might look like after the roll burnishing. As also noted above, the residual compressive stress imparted via the roll burnishing may be relieved in whole or in part by way of service in an internal combustion engine. Accordingly, the actual profile of fillet 42 shown in solid line in the left detailed enlargement is generally between profile 50 and profile 52. It will thus be appreciated that relief of the residual compressive stress can at least in certain instances be expected to change the profile of fillet 42, and allow material substrate 23 to deform outwardly. Those skilled in the art will appreciate the interplay between plastic and elastic deformation that is responsible for the imparting of residual compressive stress during pre-stressing, and its dissipation over time under certain conditions.

In the right detailed enlargement of FIG. 2, fillet 42 is shown in the same section plane as that of the left detailed enlargement. It may be noted that a profile of fillet 42 is different between the two detailed enlargements. Fillet 42 may thus be understood to have a non-uniform profile, and in particular a circumferentially non-uniform profile of rotation about center axis 28. Thus, rather than appearing the same regardless of the section plane through center axis 28, depending upon the section plane considered fillet 42 may have a profile that differs circumferentially about axis 28. In the illustrated example, the profile of rotation is non-uniform in surface contour within roll burnishing groove 54 and in the right detailed enlargement exhibits a defect in the form of a protrusion 56. Defect 56 may extend some distance circumferentially around fillet 42, but not a complete revolution, rendering the circumferentially non-uniform profile of rotation. Defect 56 may result from non-uniformity in the manner in which material substrate 23 non-uniformly fatigues during service in an internal combustion engine, but could also be an artifact of the prior roll burnishing procedure itself, or both. Regardless of the origin of defect 56 or any other defects resulting in the non-uniformity in the profile of fillet 42, it has been discovered that such non-uniformity renders fillet 42 unsuited to re-rolling. Another way to understand this principle is that non-uniformity in geometry or material properties of material substrate 23 resulting from original manufacturing, fatigue during service, or both, will make restoring the residual compressive stress to fillet 42 impossible or at least impractical by way of additional roll burnishing. As further discussed below, the present disclosure exploits this discovery by implementing alternative strategies for compressing material substrate 23 to restore residual compressive stress to fillet 42.

INDUSTRIAL APPLICABILITY

Figure 3:
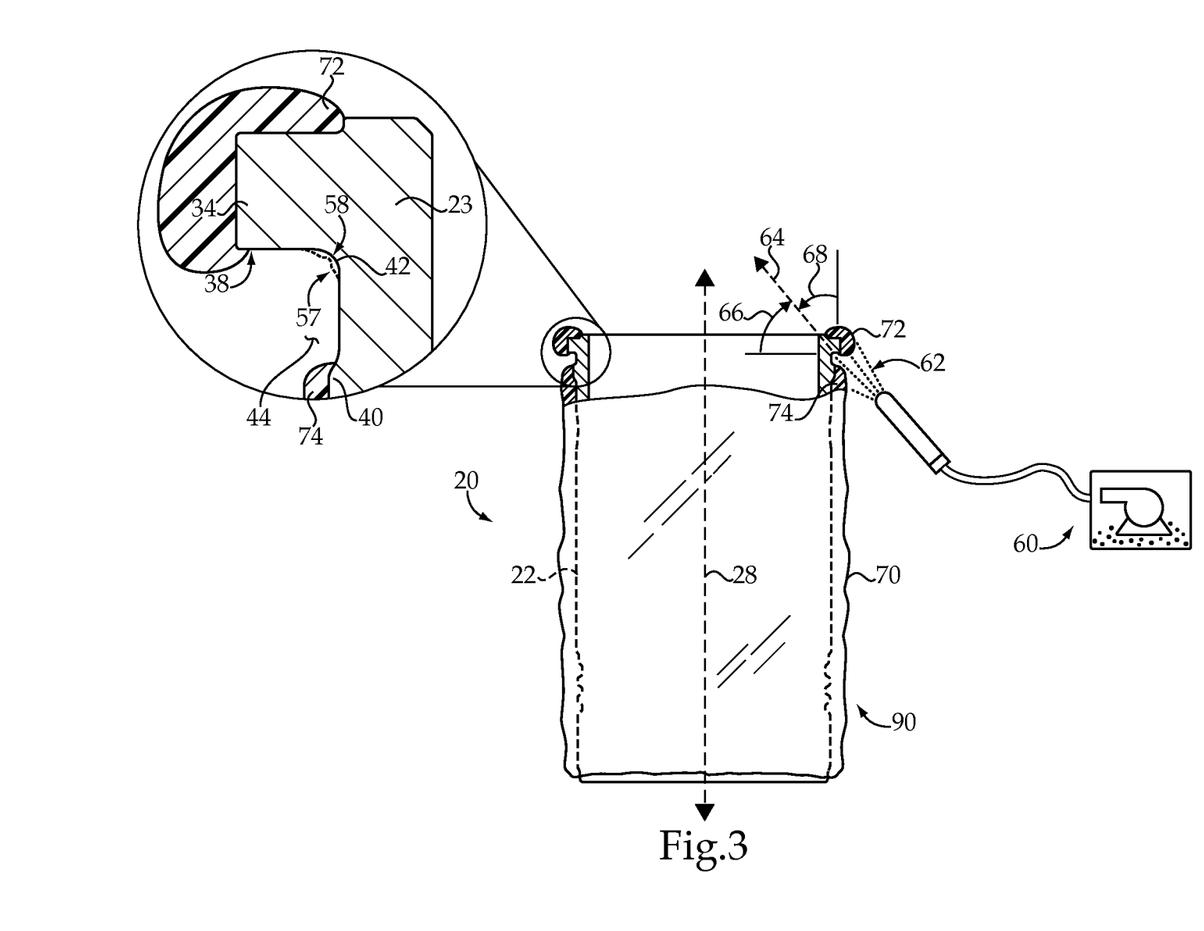
FIG. 3 is a partially sectioned side diagrammatic view of a mask and used cylinder liner assembly at a processing stage, according to one embodiment, and including a detailed enlargement.

Referring also now to FIG. 3, there is shown a mask and used cylinder liner assembly 90 for processing used cylinder liner 20 during remanufacturing. Assembly 90 includes used cylinder liner 20, and a removable mask 70 attached to liner body 22. Mask 70 may include a first mask piece 72 and a second mask piece 74. Each of mask pieces 72 and 74 might include a suitable molded mask, or a masking tape. In the illustrated instance, mask piece 72 is attached to flange 34, on a first axial side of fillet 42. Mask piece 74 is attached to liner body 22 on a second axial side of fillet 42, such that material substrate 23 is exposed for application of compressive force to restore residual compressive stress to fillet 42. Mask pieces 72 and 74 may thus be understood to obscure a first axial segment and a second axial segment of outer liner surface 26, respectively, and filler band groove 44 is exposed.

Also shown in FIG. 3 is a shot peening apparatus 60 shown as it might appear discharging a spray cone 62 of shot toward fillet 42 to compress material substrate 23. In a practical implementation strategy, spray cone 62 defines a force direction 64 whereby compressive force is applied to material substrate 23. Given the spreading nature of discharged shot during shot peening, it will be appreciated that a surface area of outer surface 26 typically greater than just fillet 42 will be shot peened, although fillet 42 is the primary target. Mask 70 will protect the obscured regions from shot peening contamination and/or treatment. In the illustrated embodiment, all or substantially all of filler band groove 44 is shot peened, and compressive force is applied to material substrate 23, on the average, in force direction 64. Radially projecting skirt 40, or at least the part forming a portion of groove 44, may also be shot peened. Force direction 64 may be oblique to center axis 28, and in one practical implementation strategy may be oriented at an angle 58 of about 45° from center axis 28, and an angle 66 of about 45° to engine block face 38. The compressive force applied via shot peening may be applied uniformly about center axis 28. Thus, one can readily visualize rotating assembly 90 about axis 28 at least one complete turn, or moving apparatus 60 at least one complete turn about axis 28 such that the compressive force is uniformly applied.

It will be recalled that a profile of fillet 42 after service in an engine may be generally between a pre-rolling profile at original manufacturing and a post-rolling profile at original manufacturing. In the detailed enlargement of FIG. 3, a pre-peening profile 57 is shown, which will be substantially the same as the actual profile shown in solid line in FIG. 2. A post-peening profile 58 is also shown in the detailed enlargement in FIG. 3, and represents an approximate profile of fillet 42 that might be observed after shot peening. It can thus be noted that a profile of rotation of fillet 42 may be deepened generally in force direction 64 via the compression of material substrate 23. The compression of material substrate 23 will further be such that the non-uniform profile of fillet 42 is reshaped via plastic deformation of material substrate 23. Based at least in part on the plastic deformation, via known properties of compressively stressed material substrates such as cast iron or steel, of which liner 20 may be formed throughout, residual compressive stress is restored to fillet 42. Restoration of the residual compressive stress to fillet 42 can render cylinder liner 22 suitable for returning to service, with an expectation of a service life at least as great as a newly manufactured cylinder liner. It may also be noted by way of the detailed enlargement in FIG. 3 that the profile of rotation of fillet 42 is more uniform after shot peening than it was prior. It is believed that whatever non-uniformities are evident in fillet 42 upon receiving cylinder liner 20 after service can be reduced by way of the plastic deformation induced by shot peening. Given the variation in conditions experienced by cylinder liners during service, even in the same internal combustion engine, when received for remanufacturing, all of the cylinder liners in any given group may have fillets with unique profiles. In other words, the fillets in cylinder liners of any given group may all have different types and extents of non-uniformity, but after remanufacturing the fillets will tend to be reshaped such that they have profiles of rotation reduced in non-uniformity within each cylinder liner and also among the group as a whole via the plastic deformation of the material substrate.

Figure 4:
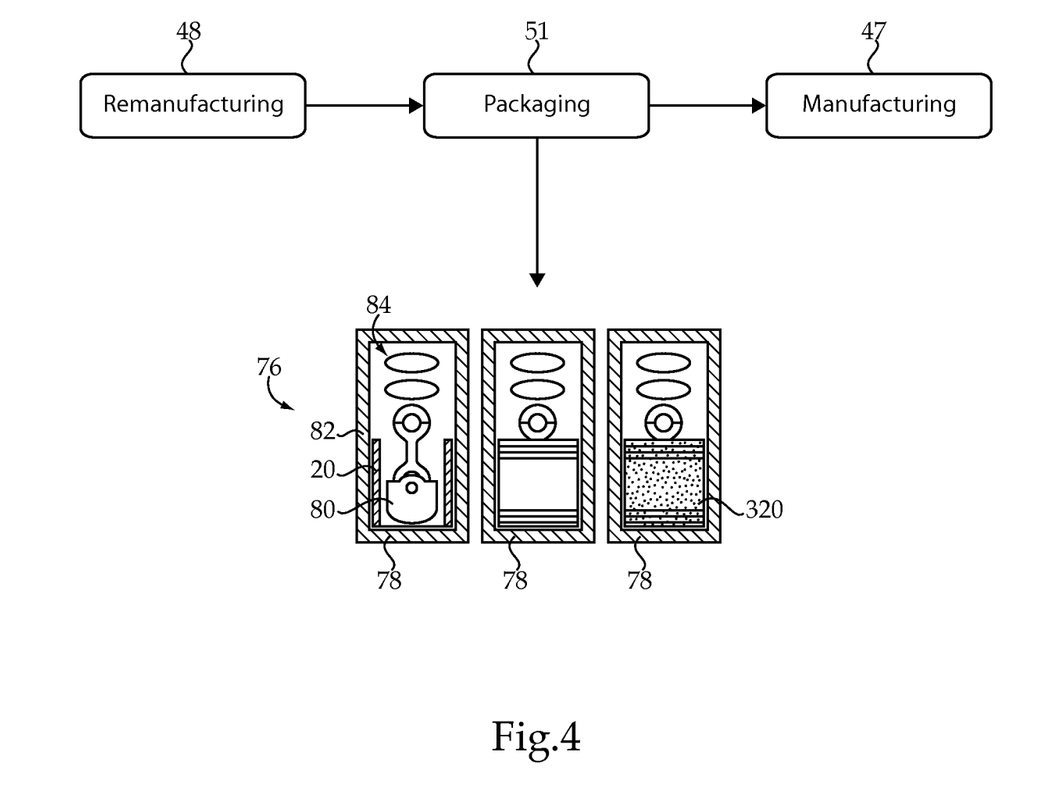
FIG. 4 is a diagrammatic view of cylinder liner processing to populate a cylinder pack inventory, according to one embodiment.

Referring also now to FIG. 4, following restoration of residual compressive stress such as by way of the peening operation depicted in FIG. 3, cylinder liners may be forwarded from remanufacturing stage 48 to a packaging stage 51. At packaging, supply streams of used cylinder liners that have been remanufactured and new cylinder liners received from a manufacturing stage 47 may be merged and packaged for populating an inventory of cylinder liners irrespective of whether the cylinder liners are used or new. In one practical implementation strategy, each of the used cylinder liners that have been remanufactured, those of the first sorted subset discussed above, may be packaged with pistons and seals in a plurality of cylinder packs 78 and placed in an inventory 76. In FIG. 4, remanufactured cylinder liner 20 is shown in a cylinder pack 78 having a package 82 containing cylinder liner 20, a piston 80, and a plurality of seals 84. Also in inventory 76 is a cylinder pack 78 formed from a new cylinder liner 320 with similar package construction and contents. All of cylinder packs 78 are interchangeable with one another. In other instances, rather than cylinder packs, used cylinder liners remanufactured according to the present disclosure might be installed in so-called long block or short block engines, or sold as loose units or packaged groups. Long block or short block engines, or fully assembled engines for that matter, might each contain both used cylinder liners having been remanufactured and new cylinder liners, or could even be equipped solely with used cylinder liners.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. For instance, while flange 34 is shown as an end flange for top support where engine block face 38 is axially inward, in other instances a flange or other mounting feature or adjoining material suitable for restoration might be located elsewhere on a cylinder liner, and could even have an engine block face that is considered axially outward. Other aspects, features and advantages will be apparent upon examination of the attached drawings and appended claims.

What is claimed is:

1. A method of remanufacturing a cylinder liner for an internal combustion engine comprising the steps of:
   receiving a used cylinder liner having a fillet relieved of residual compressive stress via service in an internal combustion engine and having a non-uniform profile, the fillet extending circumferentially around a center axis of the cylinder liner at a fatigue sensitive location and adjoining a radially projecting cylinder liner flange, and a roll burnishing groove being formed within the fillet;
   compressing a material substrate of the cylinder liner forming the fillet, such that the non-uniform profile of the fillet is reshaped via plastic deformation of the material substrate; and
   restoring residual compressive stress to the fillet at least in part via the plastic deformation;
   wherein the compressing of the material substrate includes compressing the material substrate in a manner that deepens the profile of the fillet and reduces a depth of the roll burnishing groove.

2. The method of claim 1 wherein the step of receiving includes receiving the used cylinder liner where the non-uniform profile includes a circumferentially non-uniform profile of rotation about the center axis.

3. The method of claim 2 wherein the profile of rotation is non-uniform in surface contour within the roll burnishing groove such that the fillet is unsuited to re-rolling, and further comprising a step of reducing non-uniformity in the profile of rotation via the plastic deformation.

4. The method of claim 2 wherein the used cylinder liner is formed throughout by the material substrate, and the radially projecting flange includes a radially projecting end flange having an axially inward engine block face for top support of the used cylinder liner in service.

5. The method of claim 4 wherein the step of compressing further includes applying compressive force to the material substrate uniformly about the center axis, and in a force direction oblique to the center axis.

6. The method of claim 5 wherein the step of compressing further includes compressing the material substrate such that the profile of rotation is deepened in the force direction.

7. The method of claim 5 wherein the step of compressing further includes compressing the material substrate via peening the fillet.

8. The method of claim 7 wherein peening the fillet includes shot peening the fillet such that the force direction as defined by a spray cone of the shot is oriented at about 45° to the center axis and at about 45° to the engine block face.

9. The method of claim 8 wherein shot peening the fillet further includes shot peening a filler band groove formed in part by the fillet and in part by a radially projecting skirt axially spaced from the radially projecting flange.

10. A method of processing internal combustion engine cylinder liners comprising the steps of:
    receiving a group of used cylinder liners each having a fatigue sensitive fillet relieved of residual compressive stress via service in an internal combustion engine and having a roll burnishing groove within the fillet;
    sorting the group of used cylinder liners into a first subset for remanufacturing, responsive to satisfaction of a fillet restorability criterion, and into a second subset;
    compressing material substrates forming the fillets in each of the cylinder liners of the first subset such that the fillets are reshaped via plastic deformation of the corresponding material substrate to restore residual compressive stress therein;

wherein compressing material substrates further includes deepening a profile of the fillets in each of the cylinder liners by way of peening the fillets; and forwarding the used cylinder liners following restoration of the residual compressive stress to an inventory for returning to service in an internal combustion engine.

11. The method of claim 10 wherein the fillets in the used cylinder liners of the first subset each have a unique profile when received.

12. The method of claim 11 wherein the step of sorting further includes sorting used cylinder liners having fillets free from cracks into the first subset, and sorting used cylinder liners having cracked fillets into the second subset.

13. The method of claim 11 wherein the step of compressing further includes compressing the material substrates in a filler band groove formed in part by the fillet in each of the used cylinder liners of the first subset.

14. The method of claim 13 wherein the peening further includes shot peening the filler band groove in each of the used cylinder liners of the first subset.

15. The method of claim 10 further comprising a step of packaging each of the used cylinder liners of the first subset with pistons and seals in a plurality of cylinder packs.

16. The method of claim 15 further comprising a step of populating the inventory with cylinder packs formed from the used cylinder liners, and with cylinder packs formed from new cylinder liners and interchangeable with the cylinder packs formed from the used cylinder liners.

* * * * *